(12) United States Patent
Han

(10) Patent No.: US 9,981,518 B1
(45) Date of Patent: May 29, 2018

(54) APPARATUS AND METHOD OF CONTROLLING AMPHIBIOUS VEHICLE

(71) Applicant: HANWHA LAND SYSTEMS CO., LTD., Changwon-si (KR)

(72) Inventor: Kyung Won Han, Changwon-si (KR)

(73) Assignee: HANWHA LAND SYSTEMS CO., LTD., Changwon-si (KR)

( * ) Notice: Subject to any disclaimer, the term of this patent is extended or adjusted under 35 U.S.C. 154(b) by 0 days. days.

(21) Appl. No.: 15/852,542

(22) Filed: Dec. 22, 2017

Related U.S. Application Data

(63) Continuation of application No. 15/527,624, filed as application No. PCT/KR2017/001746 on Feb. 17, 2017.

(30) Foreign Application Priority Data

Dec. 26, 2016 (KR) .......................... 10-2016-0179315

(51) Int. Cl.
*B60F 3/00* (2006.01)
*F02D 29/02* (2006.01)
*B63H 21/22* (2006.01)
*F02D 11/02* (2006.01)
*F02B 61/04* (2006.01)

(52) U.S. Cl.
CPC .......... *B60F 3/0061* (2013.01); *B60F 3/0007* (2013.01); *B63H 21/22* (2013.01); *F02D 29/02* (2013.01); *F02B 61/04* (2013.01); *F02D 11/02* (2013.01)

(58) Field of Classification Search
CPC ...... B60F 3/0061; B60F 3/0007; B63H 21/22; F02D 29/02
See application file for complete search history.

(56) References Cited

U.S. PATENT DOCUMENTS

| 6,672,916 | B1 * | 1/2004 | Lent-Phillips | ........ | B60F 3/0007 440/12.5 |
| 6,776,676 | B2 | 8/2004 | Tanaka et al. | | |
| 8,162,704 | B2 * | 4/2012 | Stine | ..................... | B60F 3/0007 440/1 |
| 2003/0153215 | A1 * | 8/2003 | Gibbs | .................. | B60F 3/0007 440/12.51 |

(Continued)

FOREIGN PATENT DOCUMENTS

| JP | 4420738 B2 | 2/2010 |
| JP | 2014108688 A | 6/2014 |

(Continued)

*Primary Examiner* — Stephen P Avila
(74) *Attorney, Agent, or Firm* — Sughrue Mion, PLLC

(57) ABSTRACT

An apparatus for controlling an amphibious vehicle includes an engine, a land propeller generating a propulsion force on land, a water propeller generating a propulsion force on water, a power distributor distributing power to the land propeller and the water propeller, a transmission for changing a shift ratio of the power supplied to the land propeller, and a controller, wherein the controller selects and executes one of a land mode for controlling travel on land, a water mode for controlling travel on the water, and a transition mode controlling the travel in a transition region, and the controller maintains an engine output torque in the land mode to be constant and maintains an engine output speed in the water mode and the transition mode to be constant.

15 Claims, 7 Drawing Sheets

(56) References Cited

U.S. PATENT DOCUMENTS

| | | | |
|---|---|---|---|
| 2004/0038602 A1 | | 2/2004 | Tanaka et al. |
| 2014/0004761 A1* | | 1/2014 | Neprud ................. B60F 3/0069 |
| | | | 440/12.52 |
| 2015/0258867 A1 | | 9/2015 | Aoki et al. |
| 2017/0306862 A1* | | 10/2017 | Waite, III ................ F02D 29/02 |
| 2017/0350331 A1* | | 12/2017 | Shost ................. F02D 41/0085 |

FOREIGN PATENT DOCUMENTS

| | | | |
|---|---|---|---|
| JP | | 5537835 B2 | 7/2014 |
| JP | | 5591145 B2 | 8/2014 |

* cited by examiner

TRACK DRIVING LOSS IN TRANSITION REGION

APPARATUS AND METHOD OF CONTROLLING AMPHIBIOUS VEHICLE

CROSS-REFERENCE TO RELATED APPLICATION

This application is a continuation of U.S. application Ser. No. 15/527,624, filed May 17, 2017, which is a § 371 National Stage of PCT/KR2017/001746 filed Feb. 17, 2017, which claims the benefit of Korean Patent Application No. 10-2016-0179315, filed on Dec. 26, 2016, in the Korean Intellectual Property Office. The entire disclosures of which are incorporated herein in their entirety by reference.

BACKGROUND

1. Field

One or more embodiments relate to an apparatus and method of controlling an amphibious vehicle, and more particularly, to an apparatus and method of controlling an amphibious vehicle capable of implementing driving performance suitable for various topographic environments and having improved efficiency and stability in driving.

2. Description of the Related Art

An amphibious vehicle that may drive both on water and land includes a water propulsion device generating propulsion power on the water and a land propulsion device generating propulsion power on land. The water propulsion device generates propulsion on the water by using an apparatus such as a waterjet that uses water as a medium. The land propulsion device generates the propulsion against the ground by using a frictional force generated between a caterpillar or a wheel and the ground due to the weight of the vehicle when the caterpillar or the wheel rotates.

In a case where the amphibious vehicle lands on the ground from the water or enters the water from the land by its own strength, the amphibious vehicle passes through a region referred to as a transition region in which shallow water and soft ground are mixed.

Generally, in the transition region, a sufficient amount of water that is used as a medium of the water propulsion device may not be continuously supplied due to the shallow water, and a track or a wheel may not obtain a sufficient ground reaction force because buoyancy in the water is applied to the vehicle. Therefore, in the transition region, it is difficult for any one of the water propulsion device and the land propulsion device to independently generate sufficient propulsion for driving the vehicle. In addition, if a velocity of the caterpillar or the wheel is wrongly controlled in the transition region, the vehicle may sink into the soft ground and may not move.

Due to the characteristics of the transition region as described above, a power unit supplying power to the water propulsion device and the land propulsion device need to be controlled according to environmental variation in the transition region, in order to improve driving stability of the amphibious vehicle in the transition region. For example, when a velocity of the vehicle on the water is equal to or greater than a predetermined level, the power required to drive the water propulsion device increases greater than the power required to drive the land propulsion device. According to the variation, when the power unit supplies power that is greater than the power required to drive the land propulsion device, more power may be supplied to the water propulsion device and driving performance of the vehicle in the transition region may be improved.

However, during when the power unit supplies the power greater than the power required to drive the land propulsion device in the transition region, if supply of the water to the water propulsion device suddenly stops, the power that is greater than an allowable power of the land propulsion device is supplied to the land propulsion device, and thus, the land propulsion device and the power unit may break.

Japanese Laid-open Patent No. 2014-108688 discloses a technique of separately installing a transmission for a water propulsion device and a transmission for wheels in order to supply power to both the water propulsion device and the wheels in the transition region. However, according to the above related art, it is difficult to rapidly deal with a sudden environmental change such as a case in which the supply of water introduced into the water propulsion device stops, and structures and controls of the vehicle become complicated since the transmission is additionally provided.

Japanese Patent Registration No. 5537835 discloses a technique of transmitting power of an engine to both the water propulsion device and the land propulsion device during the transition region, and controlling the number of revolutions of a radiator fan based on a mode signal related to control of the power transfer of the engine. According to the above technique, the number of revolutions of the radiator fan may be controlled to be suitable for the driving mode of the amphibious vehicle, but it is difficult to rapidly deal with the sudden environmental change such as a case in which the supply of the water introduced into the water propulsion device stops.

Among the techniques of improving efficiency in driving control of the amphibious vehicle in the transition region, there is a technique of sensing a variation in the load applied to the land propulsion device by using a difference between an input speed and an output speed of a torque converter that transfers the power to the land propulsion device and controlling the power unit based on the variation.

According to the above technique, during driving from the land to the transition region, input/output velocities of the torque converter are compared, and if the buoyancy applied to the vehicle increases and the land propulsion device may not further generate the propulsion power, the output of the power unit may be controlled to be suitable for the transition region.

However, the above technique is only applied when the amphibious vehicle uses the torque converter. In addition, an rpm of the land propulsion device may not be freely controlled, and thus, a velocity of the land propulsion device needs to be controlled faster than the velocity of the vehicle in order to obtain the propulsion force from the land propulsion device. However, when the velocity of the land propulsion device is greater than that of the vehicle, loss caused by a fluid friction between the land propulsion device and the water increases, and thus, an optimal propulsion force may not be obtained.

In order to prevent damages to the land propulsion device while the water propulsion device is driven under an idling condition during a travel of the amphibious vehicle in the transition region, an additional sensor may be provided at an input side of the water propulsion device. However, if the driving of the water propulsion device under the idling condition is only determined based on a signal from the sensor, the reliability of the land propulsion device may entirely degrade due to the sensor, for example, a case where errors generate in the sensor or the sensor breaks.

SUMMARY

One or more embodiments include an apparatus and method of controlling an amphibious vehicle, capable of improving efficiency and stability in controlling of the amphibious vehicle during a transition region.

One or more embodiments include an apparatus and method of controlling an amphibious vehicle by controlling a land propeller and a water propeller of the amphibious vehicle to be suitable respectively for a water region, a transition region, and a land region.

Additional aspects will be set forth in part in the description which follows and, in part, will be apparent from the description, or may be learned by practice of the presented embodiments.

According to one or more embodiments, an apparatus for controlling an amphibious vehicle, the apparatus includes: an engine controlled by an engine control signal applied from outside; a land propeller driven by the engine and configured to generate a propulsion force on land; a water propeller driven by the engine and configured to generate a propulsion force on water; a power distributor configured to distribute power transmitted from the engine to the land propeller and the water propeller, and to block supply of the power distributed to the land propeller or the water propeller according to a power distribution signal applied from outside; a transmission disposed between the power distributor and the land propeller, and configured to transfer the power transferred from the power distributor to the land propeller and to change a shift ratio of the power transferred to the land propeller according to a transmission control signal applied from outside; and a controller configured to apply the power distribution signal to the power distributor, to apply the transmission control signal to the transmission, and to apply the engine control signal to the engine.

The controller may select and execute one of a land mode, in which the power is supplied only to the land propeller by controlling the power distributor in order to control traveling of the amphibious vehicle on land, a water mode, in which the power is supplied only to the water propeller in order to control the traveling of the amphibious vehicle on the water, and a transition mode, in which the power is supplied to both the land propeller and the water propeller in order to control the traveling of the amphibious vehicle in a transition region.

The controller may maintain the engine output torque of the engine to be constant and controls the shift ratio of the transmission so that the transmission outputs a land propulsion torque required by the land propeller in the land mode, and maintain the engine output speed of the engine to be constant and control the shift ratio of the transmission so that the output speed of the land propeller reaches a target speed in the water mode and the transition mode.

The engine may include a fuel injector adjusting an amount of fuel injection, and the controller may include an engine controller that controls the engine output torque from the engine or the engine output speed of the engine by applying the engine control signal to the fuel injector.

In the water mode and the transition mode, the controller may calculate the engine output torque of the engine, calculate a transmission input torque input to the transmission, and calculate a water propulsion required torque that is required by the water propeller, so as to compare a difference between the engine output torque and the transmission input torque with the water propulsion required torque to determine whether the water propeller has entered an idle driving state, and when it is determined that the water propeller has entered the idle driving state, the controller may control the engine to output the engine output torque to be equal to or less than an allowable torque that is set in advance.

The transmission may include a hydraulic transmitter including a hydraulic element that is rotated by the power supplied from the power distributor, and a mechanical transmitter including a mechanical element that is rotated by the power supplied from the power distributor so as to change the shift ratio according to the transmission control signal applied by the controller and transfer the power.

The controller may calculate the engine output torque based on the amount of fuel injection to the engine and the output speed of the engine, and calculate the transmission input torque based on a signal transmitted from the hydraulic transmitter of the transmission.

When it is determined that the water propeller has entered the idle driving state, the controller may control the power distributor to stop the supply of the power to the water propeller.

The apparatus may further include a travel velocity detector configured to detect a travel velocity of the amphibious vehicle, and in the transition mode, the controller may control the shift ratio of the transmission so that the output speed of the land propeller has a value that is a predetermined multiple of the travel velocity detected by the travel velocity detector.

The travel velocity detector may be a satellite navigation information receiver.

According to one or more embodiments, a method of controlling an amphibious vehicle, the method includes: selecting a travel mode for selecting one of a land mode, in which a power of an engine is supplied only to a land propeller that generates a propulsion force on land, a water mode, in which the power of the engine is supplied only to a water propeller that generates a propulsion force on water, and a transition mode, in which the power of the engine is supplied to both the land propeller and the water propeller; when the land mode is selected, performing land traveling processes including controlling of an engine output, in which the engine is controlled to maintain the engine output torque of the engine to be constant, and controlling of a transmission output, in which a shift ratio of a transmission is controlled so that the transmission that transmits the power of the engine to the land propeller outputs a land propulsion torque that is required by the land propeller; and when the water mode or the transition mode is selected, performing water and transition region traveling processes comprising controlling of an engine speed, in which the engine is controlled to maintain the engine output speed to be constant, and controlling of a transmission speed, in which the shift ratio of the transmission is controlled so that an output speed of the land propeller reaches a target speed.

The engine may include a fuel injector for adjusting an amount of fuel injection, in the controlling of the engine output, an engine control signal may be applied to the fuel injector so as to control the engine output torque output from the engine, and in the controlling of the engine speed, the engine control signal may be applied to the fuel injector so as to control the engine output speed of the engine.

The water and transition region traveling processes may include: calculating the engine output torque of the engine; calculating a transmission input torque input to the transmission; calculating a water propulsion required torque that is required by the water propeller; comparing a difference between the engine output torque and the transmission input torque with the water propulsion required torque, and determining whether the water propeller has entered an idle driving state; and when it is determined that the water propeller has entered the idle driving state, controlling the engine so that the engine output torque is equal to or less than an allowable torque set in advance.

In the calculating of the engine output torque, the engine output torque may be calculated based on an amount of fuel injection to the engine and an output speed of the engine, and in the calculating of the transmission input torque, the transmission input torque may be calculated by the hydraulic transmitter of the transmission.

In the water and transition region traveling processes, when it is determined that the water propeller has entered the idle driving state, the method may further include blocking supply of the power to the water propeller.

The method may further include: detecting a travel velocity of the amphibious vehicle, and when the transition mode is selected in the selecting of the travel mode, controlling the shift ratio of the transmission so that the output speed of the land propeller has a value that is a predetermined multiple of the travel velocity detected in the detecting of the travel velocity.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
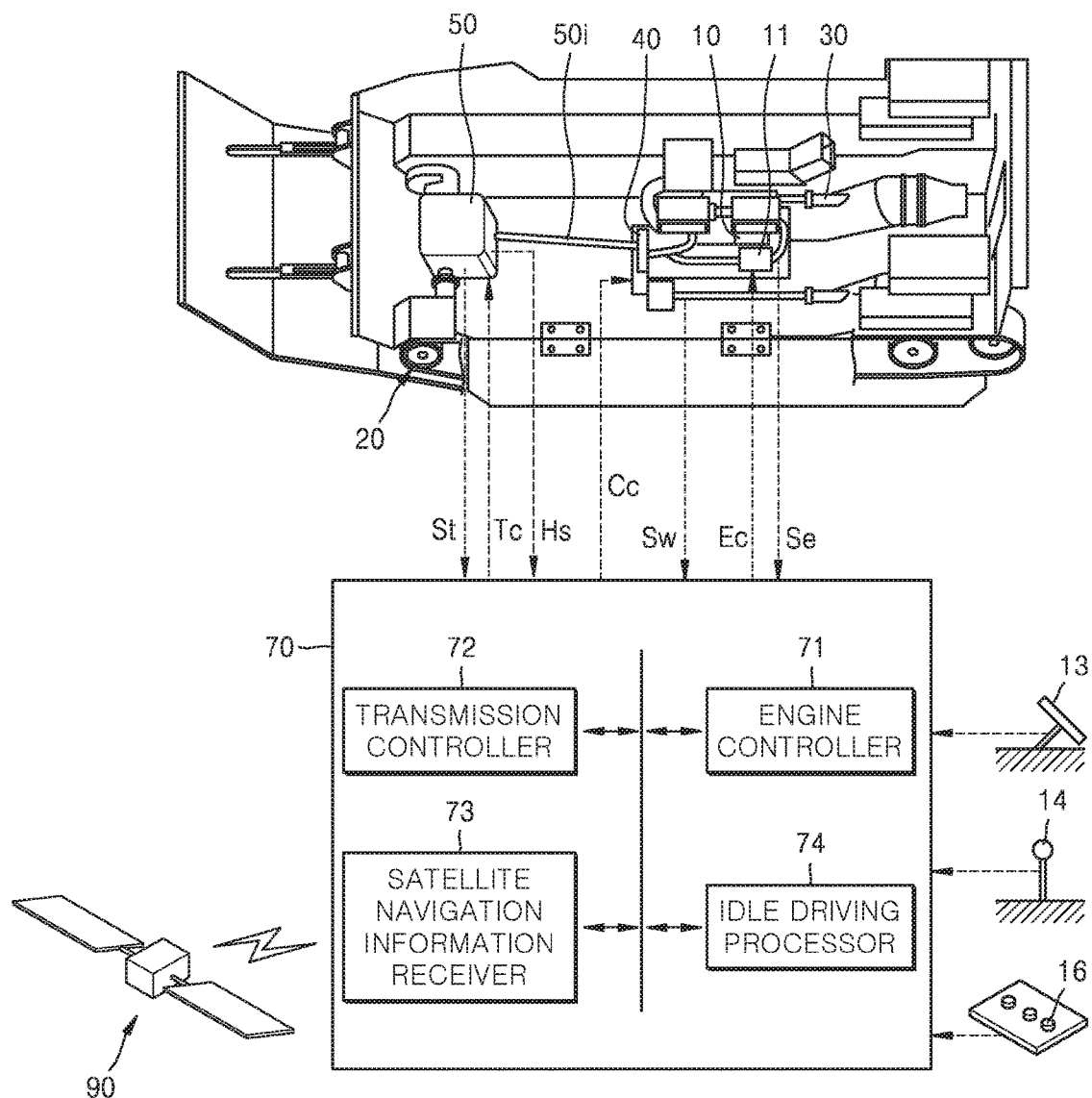
FIG. 1 is a block diagram schematically showing coupling relations among elements of an apparatus for controlling an amphibious vehicle according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, structures and operations of an apparatus and method of controlling an amphibious vehicle according to one or more embodiments will be described in detail later with reference to accompanying drawings.

FIG. 1 is a block diagram schematically showing coupling relations among elements of an apparatus for controlling an amphibious vehicle according to an embodiment.

The apparatus for controlling the amphibious vehicle according to the embodiment illustrated with reference to FIG. 1 is an apparatus provided in an amphibious vehicle and controlling driving operations of the amphibious vehicle on the water, on land, and in a transition region.

The transition region denotes a region where shallow water and soft ground are mixed when the amphibious vehicle lands on the ground from the water or enters the water from the land by its own strength.

In the descriptions below about the apparatus for controlling the amphibious vehicle according to one or more embodiments, an armored vehicle for military use is provided as an example of the amphibious vehicle. However, one or more embodiments are not limited thereto, and the amphibious vehicle may be variously implemented as a leisure vehicle, an exploration vehicle used in a rough environment, etc.

The apparatus for controlling the amphibious vehicle illustrated in FIG. 1 includes an engine 10 generating power, a land propeller 20 driven by the engine 10 to generate a propulsion force on land, a water propeller 30 driven by the engine 10 to generate a propulsion force on water, a power distributor 40 for distributing the power transferred from the engine 10 to the land propeller 20 and the water propeller 30, a transmission 50 provided between the power distributor 40 and the land propeller 20 and changing a shift ratio of the power transferred to the land propeller 20, and a controller 70 for controlling such elements as the power distributor 40, the transmission 50, and the engine 10.

The engine 10 includes a fuel injector 11 adjusting an amount of injected fuel of the engine 10. The engine 10 may be controlled in an engine speed control mode, in which a revolution speed (engine output speed) of a drive shaft output from the engine 10 is controlled to be constant, or in an engine torque control mode, in which the power (engine output torque) output from the engine 10 is controlled to be constant.

The water propeller 30 may be implemented as a water jet pump generating a propulsion force by sucking and injecting water, and the land propeller 20 may be implemented as, for example, a caterpillar track or wheels.

The controller 70 includes an engine controller 71 that may execute an engine torque control mode, in which an engine control signal Ec is applied to the fuel injector 11 so as to control an engine output torque output from the engine 10, or an engine speed control mode, in which an engine output speed that is a revolution speed of the drive shaft of the engine 10 is controlled.

Signals from an acceleration pedal 13, a transmission lever 14, and a mode selection switch 16 are transmitted to the controller 70. In addition, an engine output speed signal Se representing an engine output speed of the engine 10, a water propeller input speed signal Sw representing a revolution speed of the power input to the water propeller 30 from the power distributor 40, a transmission output speed signal St representing an output speed of the transmission 50, and a transmission input torque signal Hs representing torque of the power input to the transmission 50 are transmitted to the controller 70.

In addition, the controller 70 includes a satellite navigation information receiver 73 that may receive satellite navigation information from a satellite 90. The controller 70 may obtain information about a current travelling velocity of the amphibious vehicle based on the satellite navigation information received by the satellite navigation information receiver 73. The satellite navigation information receiver 73 is an example of a travelling velocity detector for detecting a travelling velocity of the amphibious vehicle, and one or more embodiments are not limited to the examples of the travelling velocity detector. The travelling velocity detector may be implemented as a type using an ultrasonic wave sensor, or a sensor detecting a revolution speed of an axle (tachometer).

The power distributor 40 distributes the power transferred from the engine 10 to the land propeller 20 and the water propeller 30, and blocks supply of the power to the land propeller 20 or the water propeller 30 based on a power distribution signal Cc applied by the controller 70.

Figure 2:
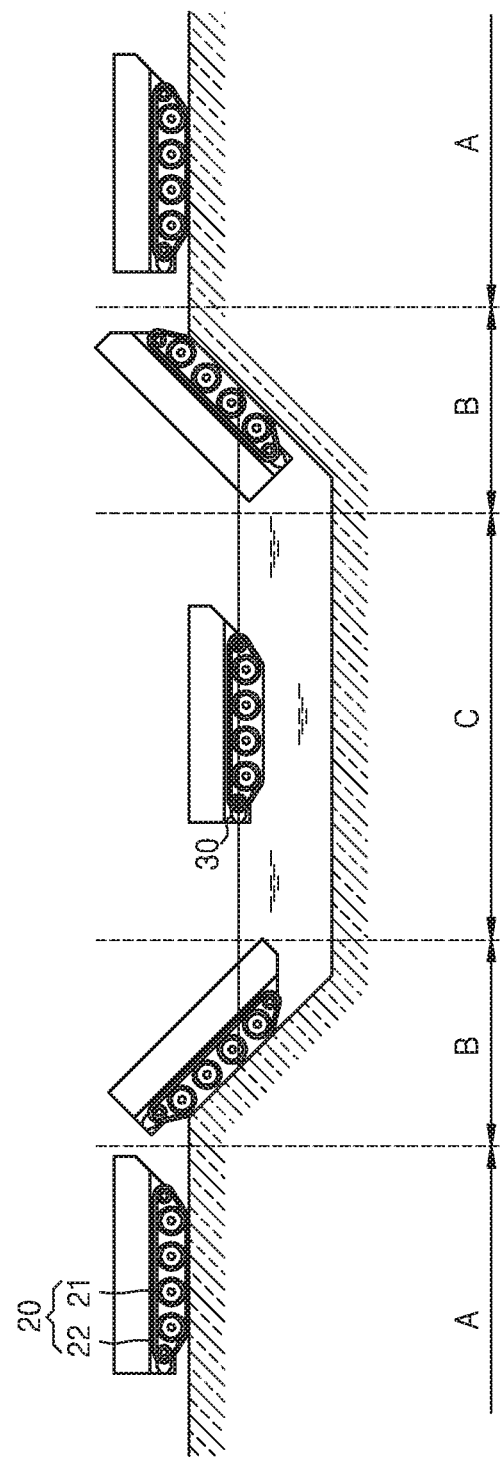
FIG. 2 is a diagram illustrating travelling modes of the amphibious vehicle of FIG.

FIG. 2 is a diagram illustrating travelling modes of the amphibious vehicle of FIG. 1.

In FIG. 2, the land propeller 20 of the amphibious vehicle includes caterpillar wheels 21 rotated by the power transferred from the engine 10, and a caterpillar track 22. One or more embodiments are not limited by the example of implementing the land propeller 20, and the land propeller 20 may be implemented as wheels.

A region denoted by 'A' is a land region in which only the land propeller 20 of the amphibious vehicle operates to generate the propulsion force of the amphibious vehicle. When the amphibious vehicle travels the land region, the controller 70 of FIG. 1 controls the power distributor 40 to execute the land mode, in which the power is supplied only to the land propeller 20 and supply of the power to the water propeller 30 is blocked.

A region denoted by 'C' is a water region, in which only the water propeller 30 of the amphibious vehicle operates to generate the propulsion force of the amphibious vehicle. When the amphibious vehicle travels the water region, the controller 70 illustrated in FIG. 1 controls the power distributor 40 to execute the water mode, in which the power is supplied only to the water propeller 30 and the supply of the power to the land propeller 20 is blocked.

A region denoted by 'B' is a transition region, in which both the land propeller 20 and the water propeller 30 of the amphibious vehicle operate to generate the propulsion force of the amphibious vehicle. When the amphibious vehicle travels the transition region, the controller 70 of FIG. 1 controls the power distributor 40 to execute the transition mode in which the power is supplied to both the land propeller 20 and the water propeller 30.

The controller 70 receives a mode selection signal of a user input through the mode selection switch 16, and then, selects and executes one of the land mode, the water mode, and the transition mode. Otherwise, even when the mode selection signal of the user is not input, the controller 70 senses a variation in the peripheral environment of the amphibious vehicle and automatically selects and executes one of the land mode, the water mode, and the transition mode.

The transmission 50 is disposed between the power distributor 40 and the land propeller 20, and transmits and transfers the power from the power distributor 40 to the land propeller 20. The controller 70 includes a transmission controller 72 that applies a transmission control signal Tc to the transmission 50 and controls a shift ratio of the power transferred to the land propeller 20.

The transmission 50 is mechanically connected to the power distributor 40 via a transmitting shaft 50i. When the power of the engine 10 is input to the transmission 50 through the power distributor 40, the transmission 50 may change the shift ratio of the power transferred to the land propeller 20 based on the transmission control signal Tc applied from the controller 70.

The transmission 50 may operate in a transmission speed control mode, in which the shift ratio is controlled so that an output speed of the power (output speed of the land propeller 20) transferred to the land propeller 20 may be a desired speed, or in a transmission torque control mode, in which the shift ratio is controlled so as to output torque (land propulsion torque) that is necessary for operating the land propeller 20.

In the land mode, the controller 70 may execute the engine torque control mode to maintain the engine output torque of the engine 10 to be constant, and at the same time, may execute the transmission torque control mode for the transmission 50 to output the land propulsion torque required by the land propeller 20.

In the land mode, the amount of fuel injection to the engine 10 is controlled based on an acceleration pedal input value input to the controller 70 from the acceleration pedal 13 manipulated by a driver. Since the engine 10 is controlled in the engine torque control mode by the engine controller 71, when a load (track load) applied to the land propeller 20 increases, the engine output speed decreases and the engine output torque increases. On the other hand, when the load applied to the land propeller 20 decreases, the engine output speed of the engine 10 increases and the engine output torque decreases.

The controller 70 changes the shift ratio based on the engine output speed signal Se representing the output speed of the engine, and a transmission algorithm (shift ratio design value) of the transmission owned by the transmission 50 by using the load applied to an output shaft of the transmission 50. That is, the transmission 50 is controlled in the transmission torque control mode for outputting the land propulsion torque required by the land propeller 20 in response to the engine torque control mode of the engine 10 described above.

Figure 3:
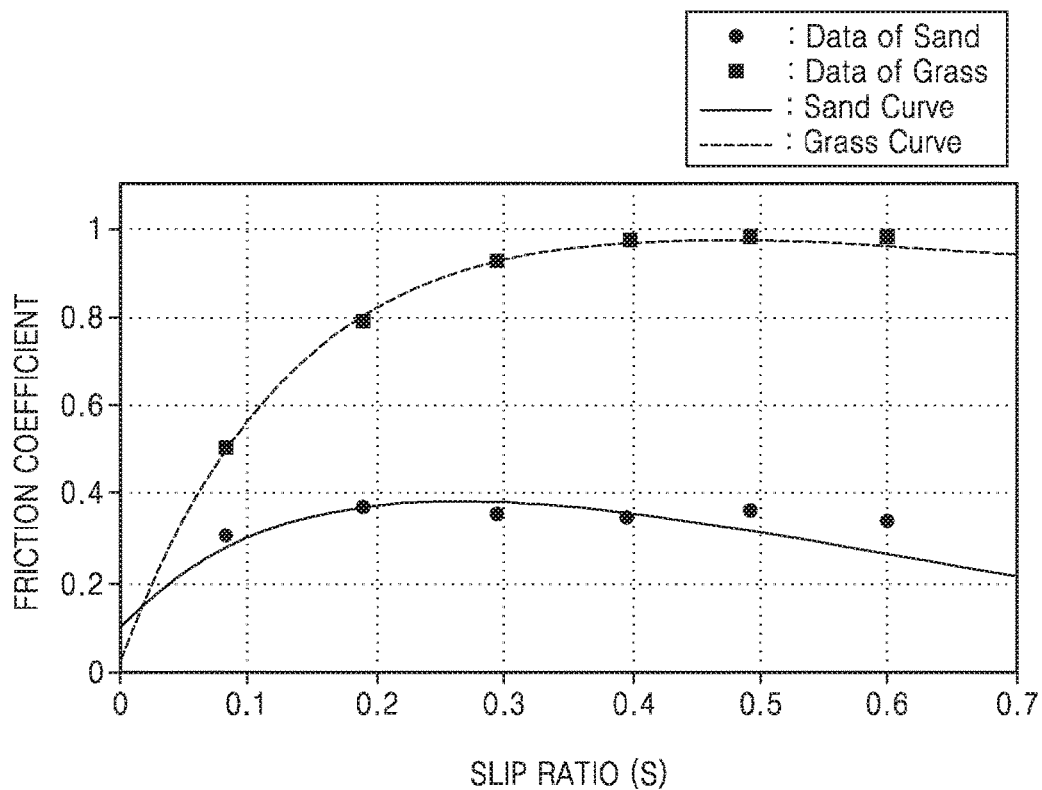
FIG. 3 is a graph of characteristics according to a frictional force applied to a land propeller of the amphibious vehicle, in relation to the travel modes of FIG. 2.

FIG. 3 is a graph of characteristics according to a frictional force applied to the land propeller of the amphibious vehicle, in relation to the travel modes of FIG. 2.

FIG. 3 shows a variation in friction coefficient versus slip ratio (S), when a vehicle having rubber wheels travels over sand ground (denoted by circular dots and a solid line) and grass ground (denoted by square dots and a dashed line).

The sand ground is a topography having a rating core index (RCI) value of about 50 and the grass ground is a topography having an RCI value of about 200, wherein the RCI denotes the strength of soil.

Referring to FIG. 3, the largest friction coefficient is shown at the slip ratio of 0.25 in the sand ground. If a rotational force of the wheels (torque) is constant, the greater the friction coefficient of the ground is, the greater the reaction force becomes, and accordingly, the propulsion force also increases. Therefore, in the sand ground, the largest propulsion force may be obtained when the velocity of the track (wheels) is 1.25 times faster than a velocity of the vehicle.

Figure 4:
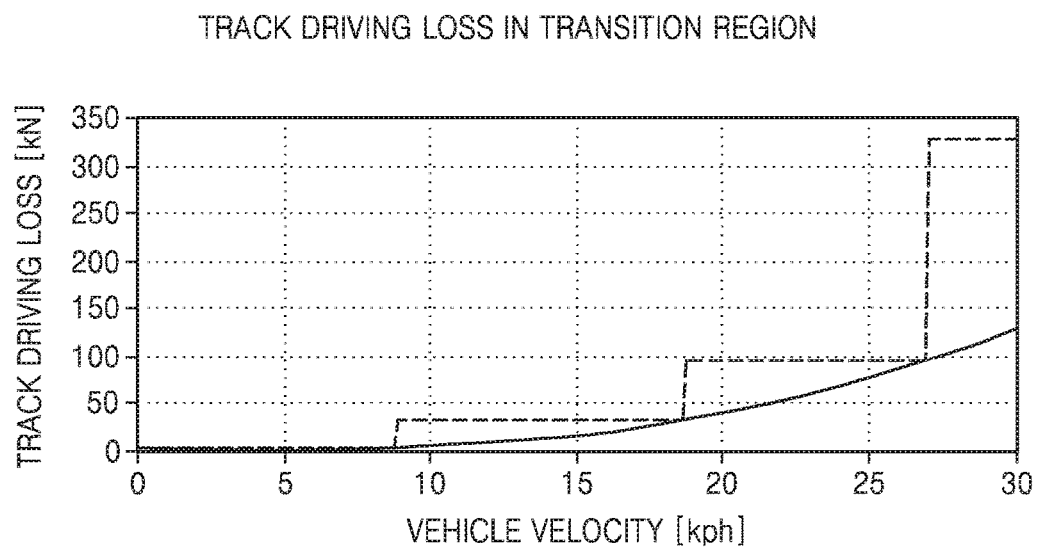
FIG. 4 is a graph showing loss in power occurring in a track of the land propeller in a transition mode regarding the transition region from among the driving modes of FIG. 2.

FIG. 4 is a graph showing loss in driving force occurring in a caterpillar track of the land propeller in a transition mode regarding the transition region from among the travel modes of FIG. 2.

FIG. 4 shows track driving loss (denoted by a dashed line) when a multi-stage transmission is used versus track driving loss (denoted by a solid line) when a continuously variable transmission (CVT) is used, when the land propeller includes caterpillar tracks.

In a case of the amphibious vehicle having the multi-stage transmission, in a low-velocity region of 40 kph. (kilometer per hour) or less, when the multi-stage transmission is used in a state where a velocity is maintained to be constant by increasing the output speed of the engine 1.5 times to twice faster than the travel velocity, the track driving loss largely increases, and thus, when the slip ratio approaches 0, there is a loss in the propulsion force by 25 to 50%, as compared with an amphibious vehicle having a CVT-type transmission.

Unlike the multi-stage transmission, in the vehicle including the CVT-type transmission, even when the shift ratio is changed in the low velocity region, the track driving loss may not greatly increase. Therefore, the transmission 50 of the amphibious vehicle according to one or more embodiments adopts the CVT-type transmission in order to increase a traveling efficiency of the amphibious vehicle in the transition region that is similar to the sand ground.

In the water mode and the transition mode, the controller 70 may execute the engine speed control mode for controlling the engine output speed of the engine 10, and at the same time, may execute the transmission torque control mode, in which an output speed of the land propeller transferred from the transmission 50 to the land propeller 20 is to be a desired speed.

In the water mode and the transition mode, the amount of fuel injection to the engine 10 is controlled based on the acceleration pedal input value input to the controller 70 from the acceleration pedal 13 manipulated by the driver. In addition, the engine output speed of the engine 10 is detected, and when a variation occurs in the engine output speed, the amount of the fuel injection to the engine 10 is controlled to maintain the engine output speed of the engine 10 to be constant.

During when the engine output speed of the engine 10 is controlled to be to be constant, the speed of the power input to the transmission 50 is maintained to be constant. The controller 70 detects the travel velocity of the amphibious vehicle, and thus, may control the shift ratio of the transmission 50 in order to control the output speed of the land propeller 20.

When the control apparatus of the amphibious vehicle executes the transition mode for controlling the traveling of the amphibious vehicle in the transition region, the travel speed of the amphibious vehicle is detected by using a travel velocity detector such as the satellite navigation receiver 73 and the shift ratio of the transmission 50 may be controlled so that the output speed of the land propeller 20 may be a predetermined multiple value of the travel velocity of the amphibious vehicle. That is, in the transition region, like the sand shown in FIG. 3, the largest friction coefficient may be obtained at the slip ratio of 0.25, and thus, the output speed of the land propeller 20 (speed of the wheels or caterpillar) is about 1.25 times faster than the travel velocity of the amphibious vehicle, and thus, the travel performance of the amphibious vehicle may be improved.

Figure 5:
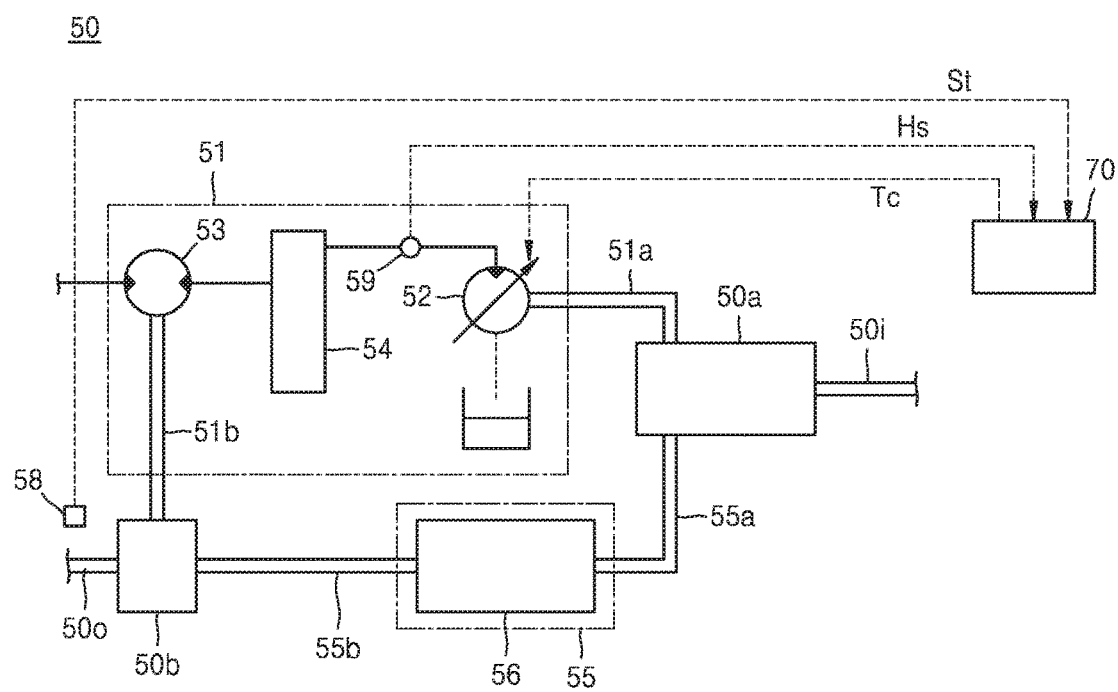
FIG. 5 is a block diagram schematically showing coupling relations among some elements related to a transmission in an apparatus for controlling the amphibious vehicle of FIG. 1.

FIG. 5 is a block diagram schematically showing coupling relations among some elements related to the transmission in the apparatus for controlling the amphibious vehicle of FIG. 1.

The transmission 50 includes a power branching unit 50a connected to a transmitting shaft 50i that is connected to the power distributor 40, a hydraulic transmitter 51 including a hydraulic element rotating along with a first shaft 51a that is rotated by the power distributed to the power branching unit 50a, a mechanical transmitter 55 rotating along with a second shaft 55a that is rotated by the power distributed to the power branching unit 50a, and a power coupler 50b combining the power of the hydraulic transmitter 51 and the mechanical transmitter 55 and outputting the combined power to a transmission output shaft 50o. The transmission 50 as illustrated in FIG. 5 is also referred to as a hydro mechanical transmission.

In addition, the transmission 50 includes a sensor 58 transmitting a transmission output speed signal St representing the revolution speed of the transmission output shaft 50o to the controller 70.

The power transferred to the transmission 50 is branched to the hydraulic transmitter 51 and the mechanical transmitter 55 while passing through the power branching unit 50a, and the power of the hydraulic transmitter 51 and the power of the mechanical transmitter 55 are combined by the power coupler 50b.

The hydraulic transmitter 51 includes a hydraulic pump 52 that is a rotating hydraulic element and a hydraulic motor 53, and an operating capacity of the hydraulic pump 52 is controlled according to the transmission control signal Tc applied by the controller 70 so as to freely control a magnitude of the power branched to the hydraulic transmitter 51.

The hydraulic motor 53 is operated by the fluid pressure supplied from the hydraulic pump 52 via a hydraulic control valve 54. The hydraulic pump 52 drives the hydraulic motor 53 to change the speed of the power branched to the hydraulic transmitter 51.

The hydraulic transmitter 51 includes a sensor 59 that senses pressure of a hydraulic line to generate a transmission input torque signal Hs. The transmission input torque signal Hs is transmitted to the controller 70.

Although the hydraulic pump 52 is shown to be only controlled by the controller 70 in the embodiments, the embodiments are not limited to the configuration of the hydraulic transmitter 51, for example, the controller 70 may control both the hydraulic pump 52 and the hydraulic motor 53 or the controller 70 may only control the hydraulic motor 53.

The mechanical transmitter 55 by-passes the power transferred from the power branching unit 50a to the power coupler 50b, or transfers the power shifted by the mechanical transmission to the power coupler 50b.

The hydraulic pump 52 operates the hydraulic motor 53 and changes the speed of the power branched to the hydraulic transmitter 51, and the power of the mechanical transmitter 55 and the power of the hydraulic transmitter 51 are finally combined by the power coupler 50b, and thus, the transmission power is output to the output shaft 50o of the transmission 50.

The controller 70 may obtain a desired certain shift ratio by controlling the transmission 50 having the above structure.

The controller 70 may sense that the water propeller 30 is driven under an idling state in the water mode and the transition mode, so as to prevent an overrun phenomenon of the engine.

In the water mode and the transition mode, the power is supplied to the water propeller 30 so that the water propeller 30 may generate the propulsion force. While the water propeller 30 operates in the water mode or the transition mode as described above, if an amount of water introduced into the water propeller 30 suddenly decreases, the load applied to the water propeller 30 greatly reduces. In this case, if the power output from the engine 10 is maintained to be constant, an excessive amount of power is concentrated on the land propeller 20, and thus, the output speed of the land propeller 20 rapidly increases, an overrun effect of the engine 10 occurs, or mechanical elements such as a bearing may be burnt.

The controller 70 may determine an overload caused by an obstacle during when the amphibious vehicle travels in the water mode or the transition mode by sensing the pressure of the hydraulic line in the hydraulic transmitter 51 (using the transmission input torque signal Hs). In addition, the controller 70 may predict a required power that the transmission 50 needs, from an inclination angle of the topography where the amphibious vehicle passes through or the travel velocity of the amphibious vehicle. To do this, the amphibious vehicle may include an inclination sensor for measuring the inclination angle of the topography.

Figure 6:
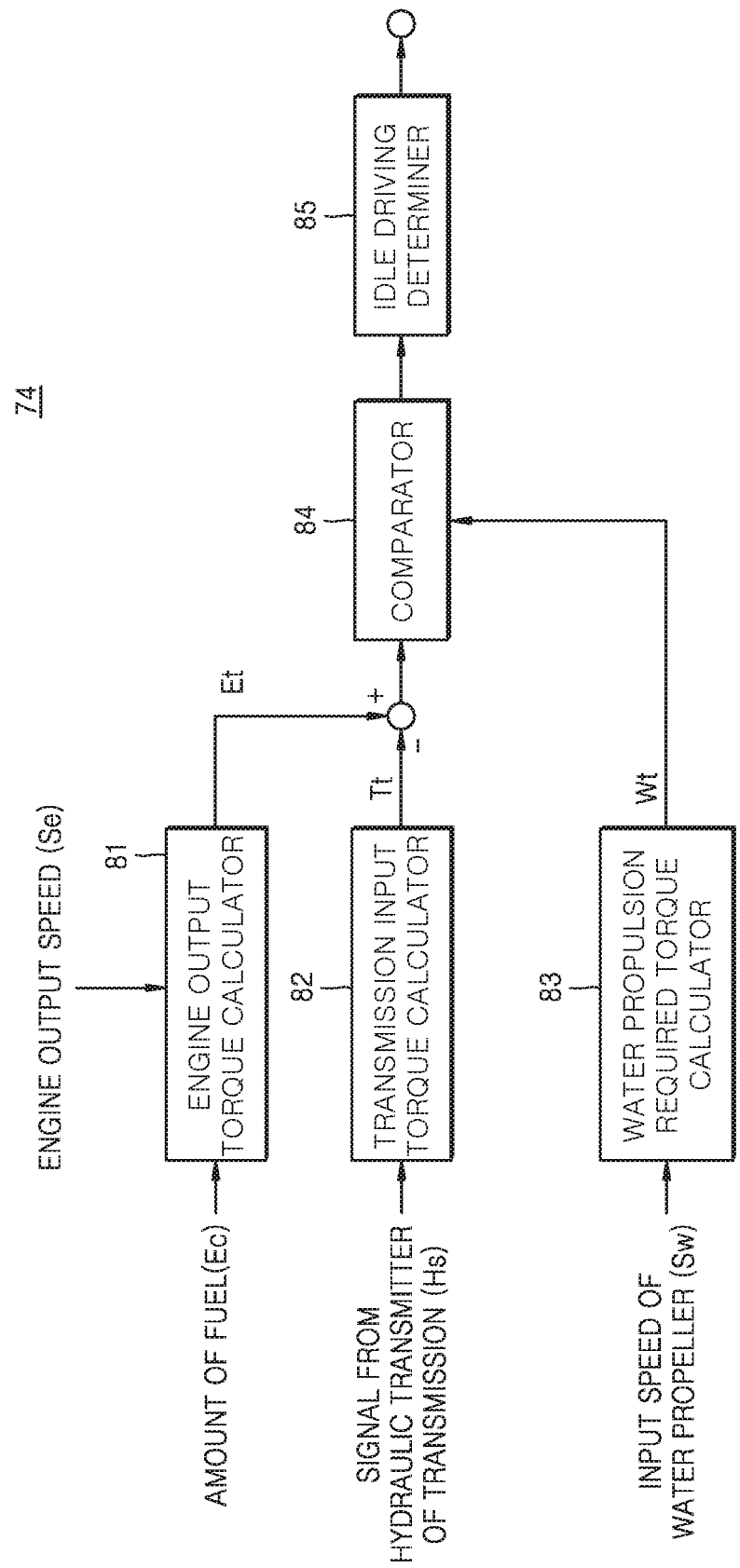
FIG. 6 is a diagram schematically showing an operational relationship between some elements of a controller in the apparatus for controlling the amphibious vehicle of FIG. 1.

FIG. 6 is a diagram schematically showing an operational relationship between some elements of a controller in the apparatus for controlling the amphibious vehicle of FIG. 1.

FIG. 6 shows an idle driving processor 74 that is an element of the controller 70. The idle driving processor 74 senses the idle driving state of the water propeller 30 in the water mode and the transition mode and controls the engine 10

The idle driving processor 74 includes an engine output torque calculator 81 that calculates an engine output torque Et of the engine 10 from an engine control signal Ec representing the amount of the fuel injection to the engine 10 and an engine output speed signal Se representing the engine output speed of the engine 10, a transmission input torque calculator 82 that calculates a transmission input torque from the transmission input torque signal Hs representing the fluid pressure in the hydraulic transmitter 51 of the transmission 50, a water propulsion required torque calculator 83 that calculates a water propulsion required torque Wt that is required by the water propeller 30 from the input speed signal Sw of the water propeller 30, a comparator 84 for comparing a difference value between an engine output torque Et and the transmission input torque with the water propulsion required torque Wt, and an idle driving determiner 85 for determining whether the water propeller 30 enters the idle driving state based on a comparison result of the comparator 84.

In a case where the water propeller 30 is determined by the idle driving determiner 85 to have entered the idle driving state, the idle driving processor 74 controls the engine 10 so that the engine output torque of the engine 10 is equal to or less than an allowable torque that is set in advance.

In addition, when the idle driving determiner 85 determines that the water propeller 30 has entered the idle driving state, the idle driving processor 74 controls the power distributor 40 to block the power supplied to the water propeller 30 in order to ensure traveling stability.

Figure 7:
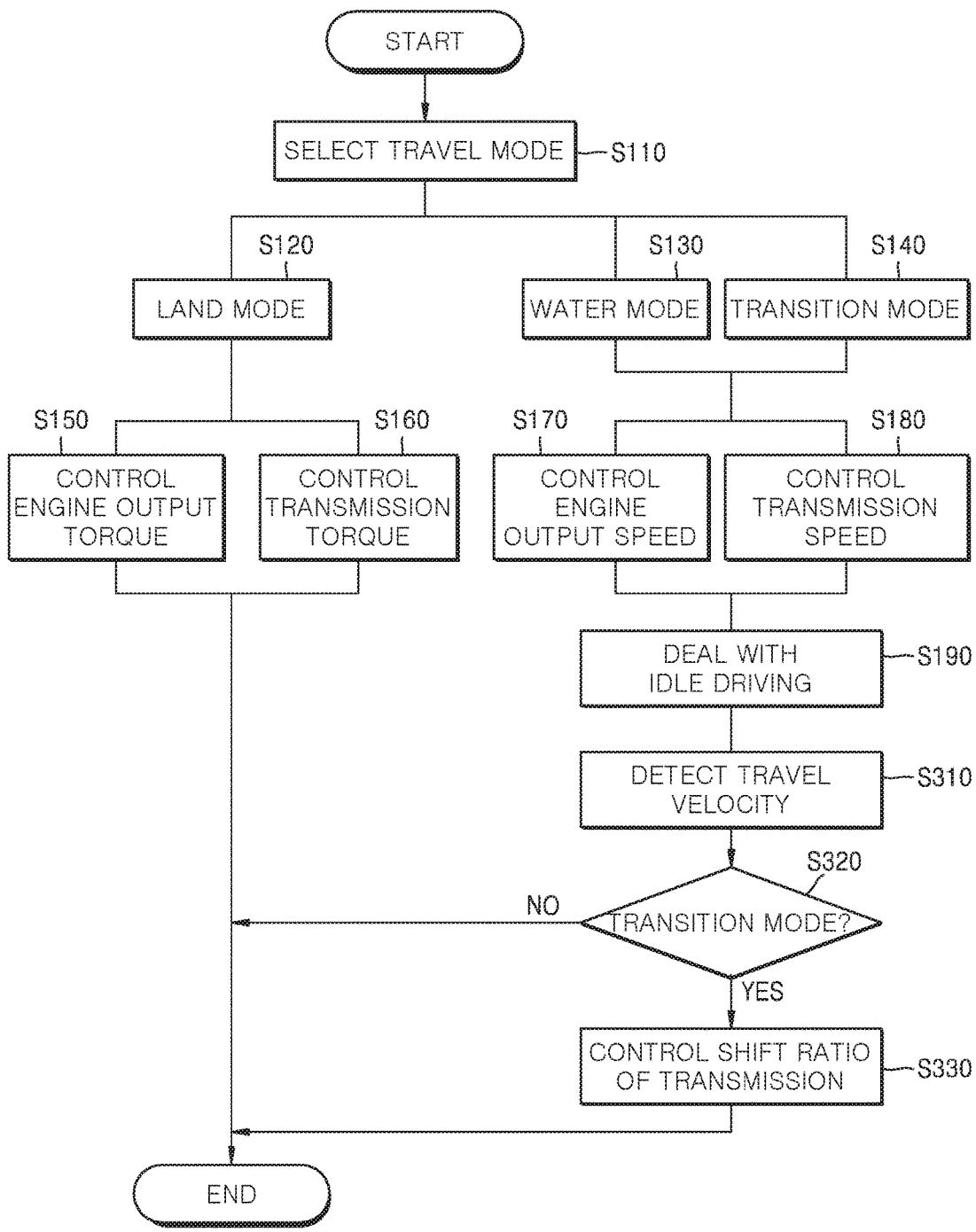
FIG. 7 is a flowchart illustrating processes in a method of controlling an amphibious vehicle according to another embodiment.

FIG. 7 is a flowchart illustrating processes in a method of controlling an amphibious vehicle according to another embodiment.

The method of controlling an amphibious vehicle according to the embodiment illustrated with reference to FIG. 7 includes selecting a travel mode of the amphibious vehicle (S110), land travelling processes (including S120, S150, and S160) including controlling an engine output for controlling an engine output torque (S150) and controlling the transmission output for controlling an output torque of the transmission (S160) when the land mode (S120) is selected, and water and transition region traveling processes (including S130, S140, S170, and S180) including controlling an engine speed for controlling an engine output speed (S170) and controlling a transmission speed for controlling an output speed of the transmission (S180) when the water mode (S130) or the transition mode (S140) is selected.

In the selecting of the travel mode (S110), one of the land mode, in which the power of the engine is transmitted only to the land propeller 20 generating the propulsion on land, the water mode, in which the power of the engine is transmitted only to the water propeller 30 generating the propulsion on the water, and the transition mode, in which the power of the engine is transmitted to both the land propeller and the water propeller, is selected. The selecting of the travel mode may be made by a mode selection signal that is input when the user manipulates the mode selection switch 16 shown in FIG. 1. The selecting of the travel mode may be automatically executed by the apparatus for controlling the amphibious vehicle according to variation in the peripheral environment of the amphibious vehicle.

When the land mode (S120) is selected, the land traveling processes (S120, S150, and S160) including the controlling of the engine output (S150), in which the engine is controlled to maintain the engine output torque of the engine to be constant, and the controlling of the transmission output (S160), in which the shift ratio of the transmission is controlled so that the transmission that transmits the power of the engine to the land propeller may output the land propulsion torque that is required by the land propeller, are executed.

When the water mode (S130) or the transition mode (S140) is selected, the water and transition region traveling processes (S130, S140, S170, and S180) including the controlling of the engine speed (S170), in which the engine is controlled to maintain the engine output speed to be constant, and the controlling of the transmission speed (S180), in which the shift ratio of the transmission is controlled so that the output speed of the land propeller may reach a target speed, are executed.

The method of controlling the amphibious vehicle may further include detecting a travel velocity of the amphibious vehicle (S310), and controlling the shift ratio of the transmission (S330) so that the output speed of the land propeller becomes a predetermined multiple of the travel velocity detected in the detecting of the travel velocity (S310) when the travel mode of the amphibious vehicle is selected as the transition mode (S320).

The water and transition region traveling processes may further include dealing with idle driving (S190).

Figure 8:
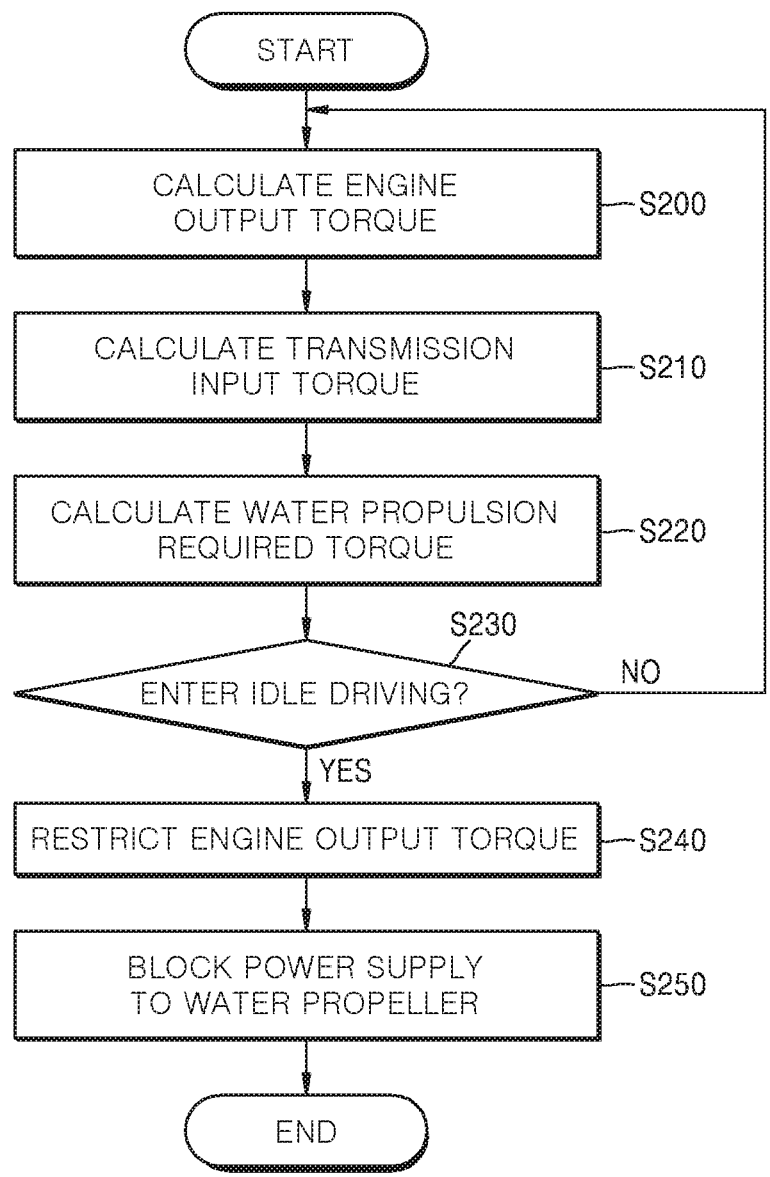
FIG. 8 is a flowchart illustrating sub-processes of some processes in the method of controlling the amphibious vehicle illustrated in FIG. 7.

FIG. 8 is a flowchart illustrating detailed processes of the dealing with the idle driving (S190) that is a partial process of the method of controlling the amphibious vehicle illustrated in FIG. 7.

The dealing with the idle driving (S190) includes calculating an engine output torque of the engine (S200), calculating the transmission input torque input to the transmission (S210), calculating the water propulsion required torque that is required by the water propeller (S220), determining whether the water propeller has entered the idle driving state by comparing a difference between the engine output torque and the transmission input torque with the water propulsion required torque (S230), and controlling the engine so that the engine output torque is equal to or less than an allowable torque set in advance (S240) when it is determined that the water propeller has entered the idle driving state.

The dealing with the idle driving (S190) may further include, when it is determined that the water propeller has entered the idle driving state in the process of determining whether the water propeller has entered the idle driving state (S230), blocking the power supplied to the water propeller (S250).

According to the apparatus and method of controlling the amphibious vehicle, while the amphibious vehicle operates in the water mode and the transition mode, the engine output speed is maintained to be constant and the shift ratio of the transmission is controlled so that the output speed of the land propeller reaches the target speed, and thus, stability may be ensured even when the water supply is stopped during the water region and the transition region and the traveling performance of the amphibious vehicle may be improved.

In particular, the idle driving state of the water propeller may be sensed, and then, when the water propeller enters the idle driving state, the engine output torque of the engine may be controlled to be equal to or less than the allowable torque. Thus, the overrun effect of the engine may be prevented, and mechanical elements of the amphibious vehicle may be protected.

In addition, while the amphibious vehicle travels over the transition region, the shift ratio of the transmission may be controlled so that the output speed of the land propeller may have a value that is a predetermined multiple of the travel velocity of the amphibious vehicle. As described above, a sufficient frictional force may be obtained in the transition region where slipping of the wheels or the caterpillar track of the land propeller may easily occur, and accordingly, the travel performance in the transition region may be improved.

In the apparatus and method of controlling the amphibious vehicle according to the one or more embodiments, when the amphibious vehicle travels the land, the engine output torque of the engine is maintained to be constant, and when the amphibious vehicle travels the water, the shift ratio of the transmission is controlled so that the output speed of the engine is maintained to be constant and the output speed of the land propeller may reach the target speed. Therefore, the performance of the land propeller may be increased during the land region, and stabilized performance may be ensured even when the supply of water stops during the water region and the transition region, and thus, the traveling performance of the amphibious vehicle may be improved.

In addition, when the water propeller enters the idle driving state, the engine output torque of the engine may be restricted to be equal to or less than the allowable torque, and thus, the overrun effect of the engine may be prevented and the mechanical elements of the amphibious vehicle may be protected.

Also, when the amphibious vehicle travels through the transition region, the shift ratio of the transmission may be controlled so that the output speed of the land propeller may have the value of a predetermined multiple of the travel velocity of the amphibious vehicle. As described above, a sufficient frictional force may be obtained within the transition region where slipping of the wheels or the caterpillar track of the land propeller may easily occur, and accordingly, the travel performance in the transition region may be improved.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the inventive concept as defined by the following claims.

What is claimed is:

1. An apparatus for controlling an amphibious vehicle, the apparatus comprising:
    an engine controlled by an engine control signal;
    a land propeller driven by the engine and configured to generate a propulsion force on land;
    a water propeller driven by the engine and configured to generate a propulsion force in water;
    a power distributor configured to distribute power transmitted from the engine to the land propeller and the water propeller, and to block supply of the power distributed to the land propeller or the water propeller according to a power distribution signal;
    a transmission disposed between the power distributor and the land propeller, and configured to transfer the power distributed from the power distributor to the land propeller and to change a shift ratio of the power transferred to the land propeller according to a transmission control signal; and
    a controller configured to apply the power distribution signal to the power distributor, to apply the transmission control signal to the transmission, and to apply the engine control signal to the engine,
    wherein the controller is configured to select and execute one of a land mode, in which the power is supplied only to the land propeller, among the land propeller and the water propeller, by controlling the power distributor in order to control traveling of the amphibious vehicle on land, a water mode, in which the power is supplied only to the water propeller, among the land propeller and the water propeller, in order to control the traveling of the amphibious vehicle in water, and a transition mode, in which the power is supplied to both the land propeller and the water propeller in order to control the traveling of the amphibious vehicle in a transition region,
    wherein the controller is configured to maintain an engine output torque of the engine to be constant and configured to control the shift ratio of the transmission such that the transmission outputs a land propulsion torque required by the land propeller in the land mode, and
    wherein the controller is further configured to maintain an engine output speed of the engine to be constant and configured to control the shift ratio of the transmission such that an output speed of the land propeller reaches a target speed in the water mode and the transition mode.

2. The apparatus of claim 1, wherein the engine includes a fuel injector configured to adjust an amount of fuel injection, and
    wherein the controller comprises an engine controller configured to control the engine output torque from the engine or the engine output speed of the engine by applying the engine control signal to the fuel injector.

3. The apparatus of claim 2, wherein, in the water mode and the transition mode, the controller is configured to calculate the engine output torque of the engine, to calculate a transmission input torque input to the transmission, and to calculate a water propulsion required torque that is required by the water propeller, so as to compare a difference between the engine output torque and the transmission input torque with the water propulsion required torque to determine whether the water propeller has entered an idle driving state, and wherein in response to determining that the water propeller has entered the idle driving state, the controller is configured to control the engine to output the engine output torque to be equal to or less than an allowable torque that is set in advance.

4. The apparatus of claim 3, wherein the transmission comprises:
a hydraulic transmitter including a hydraulic element that is rotated by the power supplied from the power distributor; and
a mechanical transmitter including a mechanical element that is rotated by the power supplied from the power distributor so as to change the shift ratio according to the transmission control signal applied by the controller and transfer the power.

5. The apparatus of claim 4, wherein the controller is configured to calculate the engine output torque based on the amount of fuel injection to the engine and the engine output speed, and to calculate the transmission input torque based on a signal transmitted from the hydraulic transmitter of the transmission.

6. The apparatus of claim 3, wherein, in response to determining that the water propeller has entered the idle driving state, the controller is configured to control the power distributor to stop the supply of the power to the water propeller.

7. The apparatus of claim 1, further comprising a travel velocity detector configured to detect a travel velocity of the amphibious vehicle,
wherein, in the transition mode, the controller is configured to control the shift ratio of the transmission such that the output speed of the land propeller has a value that is a predetermined multiple of the travel velocity detected by the travel velocity detector.

8. The apparatus of claim 7, wherein the travel velocity detector is a satellite navigation information receiver.

9. A method of controlling an amphibious vehicle, the method comprising:
selecting a travel mode for selecting one of a land mode, in which a power of an engine is supplied only to a land propeller, among the land propeller and a water propeller, that generates a propulsion force on land, a water mode, in which the power of the engine is supplied only to the water propeller, among the land propeller and the water propeller, that generates a propulsion force on water, and a transition mode, in which the power of the engine is supplied to both the land propeller and the water propeller;
when the land mode is selected, performing land traveling processes comprising controlling an engine output, in which the engine is controlled to maintain the engine output torque of the engine to be constant, and controlling a transmission output, in which a shift ratio of a transmission is controlled such that the transmission that transmits the power of the engine to the land propeller outputs a land propulsion torque that is required by the land propeller; and
when the water mode or the transition mode is selected, performing water and transition region traveling processes comprising controlling an engine speed, in which the engine is controlled to maintain an engine output speed to be constant, and controlling a transmission speed, in which the shift ratio of the transmission is controlled such that an output speed of the land propeller reaches a target speed.

10. The method of claim 9, wherein the engine comprises a fuel injector for adjusting an amount of fuel injection, in the controlling the engine output, an engine control signal is applied to the fuel injector so as to control the engine output torque output from the engine, and in the controlling the engine speed, the engine control signal is applied to the fuel injector so as to control the engine output speed of the engine.

11. The method of claim 10, wherein the water and transition region traveling processes comprise:
calculating the engine output torque of the engine;
calculating a transmission input torque input to the transmission;
calculating a water propulsion required torque that is required by the water propeller;
comparing a difference between the engine output torque and the transmission input torque with the water propulsion required torque, and determining whether the water propeller has entered an idle driving state; and
when it is determined that the water propeller has entered the idle driving state, controlling the engine such that the engine output torque is equal to or less than an allowable torque set in advance.

12. The method of claim 11, wherein the transmission comprises:
a hydraulic transmitter including a hydraulic element that is rotated by the power supplied from the engine; and
a mechanical transmitter including a mechanical element that is rotated by the power supplied from the engine.

13. The method of claim 12, wherein, in the calculating the engine output torque, the engine output torque is calculated based on an amount of fuel injection to the engine and the engine output speed, and in the calculating the transmission input torque, the transmission input torque is calculated by the hydraulic transmitter of the transmission.

14. The method of claim 11, further comprising blocking supply of the power to the water propeller in the water and transition region traveling processes, when it is determined that the water propeller has entered the idle driving state.

15. The method of claim 9, further comprising:
detecting a travel velocity of the amphibious vehicle, and
when the transition mode is selected in the selecting of the travel mode, controlling the shift ratio of the transmission such that the output speed of the land propeller has a value that is a predetermined multiple of the travel velocity detected in the detecting of the travel velocity.

* * * * *